(12) United States Patent
Lumbreras

(10) Patent No.: US 6,299,735 B1
(45) Date of Patent: Oct. 9, 2001

(54) METHOD FOR SOLID-LIQUID SEPARATION IN WATER-BASED SOLUTIONS

(75) Inventor: Manuel G. Lumbreras, Albuquerque, NM (US)

(73) Assignee: U.S. Aquasonics Corp., Albuquerque, NM (US)

( * ) Notice: Subject to any disclaimer, the term of this patent is extended or adjusted under 35 U.S.C. 154(b) by 0 days.

(21) Appl. No.: 09/369,067

(22) Filed: Aug. 5, 1999

Related U.S. Application Data

(60) Provisional application No. 60/096,280, filed on Aug. 12, 1998.

(51) Int. Cl.$^7$ ............................. B01D 1/18; B01D 3/00; C02F 1/04
(52) U.S. Cl. ............................. 203/10; 203/40; 203/90; 159/48.1; 210/737; 210/774
(58) Field of Search .................. 203/90, 10, 11, 203/100, 40, 2, DIG. 18, DIG. 17; 202/236; 239/9, 422, 428, DIG. 23; 210/774, 737; 159/32, 48.1

(56) References Cited

U.S. PATENT DOCUMENTS

| | | | |
|---|---|---|---|
| 2,887,390 | 5/1959 | Coulter et al. | 99/199 |
| 3,039,107 | 6/1962 | Bradford | 159/48 |
| 3,432,636 | 3/1969 | Sargeant | 219/10.65 |
| 3,642,393 * | 2/1972 | Ross et al. | 29/1.22 |
| 3,780,161 | 12/1973 | Berquin et al. . | |
| 3,790,080 * | 2/1974 | Babington | 239/8 |
| 3,871,180 | 3/1975 | Swanson . | |
| 4,213,924 * | 7/1980 | Shirley, Jr. | 264/7 |
| 4,292,121 | 9/1981 | Caffes . | |
| 4,323,424 | 4/1982 | Secunda et al. | 159/48 |
| 4,352,717 | 10/1982 | Watanabe et al. . | |
| 4,437,867 * | 3/1984 | Lerner | 55/233 |
| 4,721,250 * | 1/1988 | Kennedy et al. | 239/493 |
| 4,762,276 * | 8/1988 | Foust | 239/8 |
| 5,103,763 * | 4/1992 | Goldowsky et al. | 239/704 |
| 5,207,928 | 5/1993 | Lerner | 210/774 |
| 5,232,556 | 8/1993 | Passarelli | 202/177 |
| 5,437,691 * | 8/1995 | Lauterbach | 423/500 |
| 5,458,739 | 10/1995 | Boucher et al. | 202/153 |
| 5,695,643 | 12/1997 | Brandt et al. . | |

FOREIGN PATENT DOCUMENTS

| | | | |
|---|---|---|---|
| 0628331 | 12/1994 | (EP) . | |
| 2018732 | 5/1991 | (ES) | C02F/1/04 |

* cited by examiner

*Primary Examiner*—Virginia Manoharan
(74) *Attorney, Agent, or Firm*—William A. Bonk, III; Dykema Gossett, PLLC

(57) ABSTRACT

An array of sonic hydraulic nozzles for injecting a mixture of water with dissolved or suspended particulate into a chamber to form a continuous spray of spherical droplets. Low pressure areas form in the wakes of the droplets which promotes a phase change and evaporation upon being submerged in heat vortices created along the edges of the sonic shock waves. All dissolved and/or suspended solid particles in the mixture precipitate from the spray upon the vaporization of the water. Shortly thereafter, the particle-free vapor re-condenses into a dense water mist of substantially pure water, while releasing the excess heat captured in the evaporation vortices. The water mist then is absorbed by nucleating screens located above the nozzles. The screens concentrate the dense mist into water streams through a channel running out of the apparatus. The invention makes efficient use of the latent heat present in ambient air to supply all phase change energy requirements to affect a very low cost solid-liquid separation.

20 Claims, 7 Drawing Sheets

METHOD FOR SOLID-LIQUID SEPARATION IN WATER-BASED SOLUTIONS

REFERENCE TO EARLIER APPLICATION

This Application claims the benefit of U.S. Provisional Application No. 60/096,280, filed Aug. 12, 1998, by Manuel G. Lumbreras, entitled Technique andApparatusfor Very Economical Solid-liquid Separation in Water-Based Compounds: The Sonic Separation Still Process.

BACKGROUND OF THE INVENTION

1. Field of the Invention

The invention relates to liquid-solid separation. More specifically, the invention relates to recovering useable water and solids from salt and brackish water and water-based solutions.

2. Discussion of Related Art

Many techniques have been developed for separating liquids from solids in water-based compounds, such as where particles and substances are dissolved in or suspended in water. Examples of such compounds include solid and particulate matter dissolved mixed, or in suspension in industrial and urban polluted waters, which may contain dissolved metals, dissolved complex organics, solvents and emulsions, radioactive contaminants and others. Other compounds include naturally occurring sea and brackish waters, mineralized waters, or man-made solutions used in industrial processes, food processing, fossil fuels extraction, mineral extraction and others. The present invention is suited for solid-liquid separation of all the above, with very low capital and operating costs.

Current separation methods use a variety of techniques for separating solids from their liquid bases. In general, the techniques focus on recovery of the solid component, neglecting the liquid. With respect to saline and contaminated waters, applied techniques are purposed at rejecting solid particulate and recovering the water base. In this latter case however, present inefficient separation methods result in poor recovery and costly processing, such as those that involve subjecting solutions to chemical treatments and heating; evaporating the liquids through boiling of the solutions and recovering some of the liquid through condensation; forcing the liquids through high pressure devices; and/or passing them through special membranes to retain some or all of the molecules of the dissolved particles.

Current techniques for water production and treatment are numerous. However,—commercially implemented methods that are able to obtain fresh water from saline and/or contaminated waters are few, the main ones being distillation, reverse osmosis and electrodyalisis. Although substantially different in approach, each technique is fundamental flawed for efficient water recovery by being very energy-intensive. This, in turn, causes high capital and operating costs. Additionally, performances associated with each technique tend to be very low: 25% to 40% for distillation; 30% to 50% for reverse osmosis; and lower still for electrodyalisis.

Most current water treatment systems for producing sizeable amounts of potable water require substantial amounts of energy in the form of heat and high pressures. As a result, the systems require expensive process equipment such as pressure vessels, heat exchangers and chemical digesters and processors. Major water treatment systems also involve filtration, which requires the use of expensive, perishable filtering organic membranes, thus are fettered by high capital and operating costs, which results in uneconomical recovery expenses.

This high-energy dependency also tends to result in significantly low performance. If energy is equivalent of 'work', the amount of work applied to a given separation process is geometrically proportional to the amount of solids dissolved in the solutions. A solution having high-solid contents requires more work to separate the solids from the solution than a solution that has less solid contents. The more efficient processes, in the best of circumstances, require at least 50 joules per gram of solution treated, which far exceeds the 2.5 joules per gram theoretically needed for separating solids from its water base. This excess work lowers performances and substantially increases process costs.

Some processes require high-temperature environments, gaseous high-speed currents or compressed air to effect the separation. Some processes involve drying by pulverizing heated solutions; atomizing hot liquids; drying in fluid beds; filtering through membranes; atomizing compressed air-liquid mixtures, etc. However, each process for solid-liquid separation application has serious limitations, especially in the separation of suspended or dissolved particles in water solutions. A major limitation is the requirement of an average of 2,000 joules per gram of solution treated, mostly in the form of heat, electricity, high pressures or a combination of the three.

In the separation of salts in sea and brackish waters, the use of compressed air to drive and atomize the saline solutions transfers the inefficiencies of a low performance energy-intensive driver, such as compressed air, resulting in operating costs equal or greater than other conventional desalination methods, such as distillation. Moreover, as compressed air disperses and diffuses the water vapor more than any other medium, the large masses of air mixed with the vapor require large condensing cooling devices, resulting in higher capital costs.

Spanish Patent No. ES 2,018,732, issued May 1, 1991, to M. Lumbreras y Gimenez; and U.S. Pat. No. 5,207,928, issued May 4, 1994, to E. J. Lemer describe generating, with compressed air, a stream of high-velocity saltwater droplets that vaporize without being heated. Salt precipitates from the vaporizing liquid and is recovered in a pan while the resulting water vapor is recovered by showering the water vapor with liquid water. Saltwater is mixed with compressed air. This mixture then is directed through an indistinct pneumatic nozzle that atomizes the mixture in a chamber where temperature and relative humidity are at ambient (room) levels. The volume and effect of compressed air mixed with the water and the high velocity of the mixture at the nozzle exit not only limits the volume of water that can be recovered, but diffuses the vapor inside the chamber by an entrained air mass that is approximately 30 times larger at a short distance from the nozzle's orifice. Diffusing water vapor into the chamber supersaturates the ambient air. At a relative humidity of 100% or more, air is unable to provide the energy necessary for evaporation, which impedes the process. Also, large amounts of air induce the diffused vapor to recombine with the separated salt particles.

U.S. Pat. No. 4, 323,424, issued Apr. 6, 1982, to D. J. Secunda et al. also addresses desalinization. However, both the '424 and the '928 patents do not address the formation of microsized, non-evaporated droplets that are indistinguishable from vapor. This reduces the amount of fresh water produced. Fresh water production is further complicated by the minute size of the droplets, typically 1 to 10 microns in diameter. Once the droplets evaporate, the resulting salt particles are of sub-micron size. For example, a saline droplet of 1 micron in diameter, with an average NaCl content of 3.5% by weight, as it is the case with seawater, would precipitate a particle less than $1/50^{th}$ of one micron in diameter. According to Stokes' Velocity of Sedimentation Law, particles up to 1 micron in diameter tend to behave as molecules and remain suspended in the air for indefinite periods, thus are able to recombine with the water vapor. For brackish waters with salt content of 0.5% by weight or less, processing is very difficult, as the solid salt particles would have diameters smaller than 0.005 microns. Only droplets of 30 microns in diameter and up will shed salt particles large enough to fall quickly by gravity. Thus, far from dropping to the bottom of the chamber as these patents describe, salt particles derived from droplets less than 30 microns in diameter will remain suspended in the air for an undetermined amount of time, recombine with the water vapor produced and be transported with the vapor to the recovery chamber, driven by blower-produced air currents. Thus, the collected liquid will be mostly saltwater.

Additionally, a substantial amount of vapor is produced by the small water droplets that readily mixes with the large masses of ambient (secondary) air entrained by the initial compressed (primary) air at nozzle exit. This rapidly spreading vapor not only cannot change into water mist, since the large masses of entrained air impede condensation, but the vapor also fills the chamber quickly. A chamber filled with vapor causes an entropy dilemma, whereby the increase in overall humidity levels saturates the chamber, exhausting the potential for evaporation of the secondary air. This vapor will warm up and expand. This in turn disables the remaining air from vaporizing additional droplets. Without heat from the secondary air, the separation process stops.

Some of the techniques described counter these adverse effects by generating an ambient air current in an upward and oblique direction with a fan or blower at successive intervals from the lower portion of the chamber. However, the air current crossing the path of the suspended sub-micron salt particles fuses the salt particles with expanded fresh water vapor. Further, the intermittent blower also tends to recombine a portion of the separated water with larger salt particles, falling to the bottom of the chamber when the blower is off. The blower equipment also increases capital and operating expenses, thus increasing the final cost of any suitable water collected.

Although these techniques support a low air-water ratio of 1:10, the use of a compressor consumes over 18 kW/h per cubic meter of fresh water produced. This high power consumption renders the process non-competitive with current desalination techniques, such as distillation, which uses less power.

In view of the above, producing inexpensive, reusable water requires a separation process that derives a product with the least possible work. Economically obtaining reusable water from contaminated or sea/brackish waters ideally should separate the contaminants and salts from their liquid bases at normalized or standard room temperature and pressure (STP). A water recovery process that operates at STP eliminates the need for energy-intensive process engineering that otherwise would be needed to drive the separation. Unfortunately, none of the foregoing provides a method and apparatus for economical solid-liquid separation in water base solutions that separates contaminants and salts from their liquid bases at standard room temperature and pressure. None of the aforementioned references, taken alone or in combination, are seen as teaching or suggesting the presently claimed Method and Apparatus for Economical Solid-Liquid Separation in Water-Based Solutions.

SUMMARY OF THE INVENTION

The invention provides a method and an apparatus for economical solid-liquid separation in water-based solutions that separates contaminants and salts from their liquid bases at standard room temperature and pressure. The invention provides an affordable separation process that operates with low energy requirements. The invention does not rely on apriori subjecting the solutions to chemical treatment, evaporation and condensation, such as in distillation. The invention does not rely on: high pressures; mechanical or electrical filtering through membranes, such as in reverse osmosis, electrodialysis, ultra-, micro- or nano-filtration; or compressed air as a vehicle for impulsion and atomizing the solutions. The invention provides a method and an apparatus for purification and high-ratio recovery of reusable waters without a posteriori subjecting the reusable waters to chemical cleansing, chlorinating or fluoridation, without having to re-pass the reusable waters through special membranes and without having to pacify the reusable waters after recovery. The invention provides a method and an apparatus for economical solid-liquid separation in water-based solutions with which reusable and/or pure water may be obtained at a fraction of the cost of present capital-intensive water treatment methods. The invention provides a method and an apparatus for the separation of dissolved solids from contaminated waters and the recuperation of reusable water without having to statically evaporate the solution, without having to add or treat the solution with organic or inorganic matter or chemicals, or to pass it through membranes. The invention provides a method and an apparatus for separating the solids dissolved or in suspension in contaminated waters and recuperating reusable water with low uses of energy and capital. The invention provides a method and an apparatus for the separation of salts from saline waters and for recovering fresh water without having to heat the saline waters to the boiling point until evaporation, without cooling the fresh water in order to obtain large quantities of same, without subjecting the liquids to high pressures and passing the liquids through special membranes, and without the need for compressed air to atomize the saline liquids. The invention provides a method and an apparatus for desalting sea and brackish waters and recovering fresh water with low use of capital and energy. The invention provides a method and an apparatus for the separation of solids from water-based liquids in industrial processes, for recovering and/or recycling of the water used in the processes and for the recovery of the particles or solids dissolved or in suspension in the liquids with a minimum use of capital and energy. The invention provides a sonic hydraulic nozzle system for the separation of solids in water-based solutions and the recuperation of both reusable water and the dissolved solids, using minimum amounts of capital and energy. The invention provides improved elements and arrangements thereof, in an apparatus and method for the purposes described which are inexpensive, dependable and effective in accomplishing its intended purposes.

The invention exploits the super-efficient transference of room air's latent heat to water-based solutions to effect evaporation when the solutions are forced into low-pressure areas. This heat transfer occurs when a feed is injected at high velocities into a chamber where it evaporates upon impact with still air. The transfer takes place in the high-energy, low-pressure regions created by the high velocity jet solution, evaporating all the water therein. While evaporating, the solid contents present in the feed precipitate. As the vapor leaves the low-pressure regions, the vapor re-condenses into substantially pure water.

Utilizing the latent heat present in the ambient air for evaporation of water feed at room temperature and local pressure drastically reduces the energy needed to obtain a unit of fresh water, dramatically enhancing performance and reducing both capital and operating costs. Avoiding high pressures or compressed air and producing water in its liquid form instead of vapor, eliminates expensive process equipment, such as boilers, heat pumps, heat exchangers, compressors, high-pressure pumps and membranes. The corresponding reduction in the amount of process equipment reduces substantially capital expenditures in a water treatment plant, while obtaining significant savings on operating costs. Additionally, as the invention promotes reusable water in liquid form, the plant can use relatively compact devices, further reducing capital costs. Finally, as the contaminated or saline liquids are not chemically pre-treated or pre-heated, the water produced does not require pacifying or cooling, does not need chemical digesters and processors, and is ready for consumption. The simplicity of processing equipment increases overall performance, which can approach 90%.

The invention addresses the urgent need for alternative economical ways of obtaining fresh water from saline waters, such as sea and brackish waters. Food processing also benefits from the present separation method because the invention eliminates costly heated preparation processes. Also, cleaning oil spills, contaminated ground water, urban water runoff and industrial waters can benefit from the advent of a new, inexpensive technology for solid-liquid separation.

An embodiment configured according to principles of the invention includes a nozzle or an array of nozzles that, with a moderate pressure of between 8 and 10 atmospheres, inject(s) the water solutions to be cleaned of the dissolved and/or suspended particles. The nozzle or nozzles accelerate (s) the particles to sonic or subsonic velocities under controlled conditions. The invention includes a mechanism for injecting the water-based solutions through the nozzles. The invention also includes a mechanism for recovery of the water and the particles dissolved or in suspension. The invention provides a system or an array of pressure manifolds that locate the nozzles in a horizontal axis and a mechanism for impelling the solutions through the manifolds. The invention provides a mechanism for avoiding the clogging of the nozzle orifices.

These and other features of the invention will be appreciated more readily in view of the drawings and detailed description below.

BRIEF DESCRIPTION OF THE DRAWINGS

The invention is described in detail below with reference to the following drawings, throughout which similar reference characters denote corresponding features consistently, wherein.

DETAILED DESCRIPTION OF THE INVENTION

The invention is a method and an apparatus for economical solid-liquid separation in water-based solutions that separates solid contaminants from their liquid bases at standard room temperature and pressure with minimal energy requirements.

Figure 1:
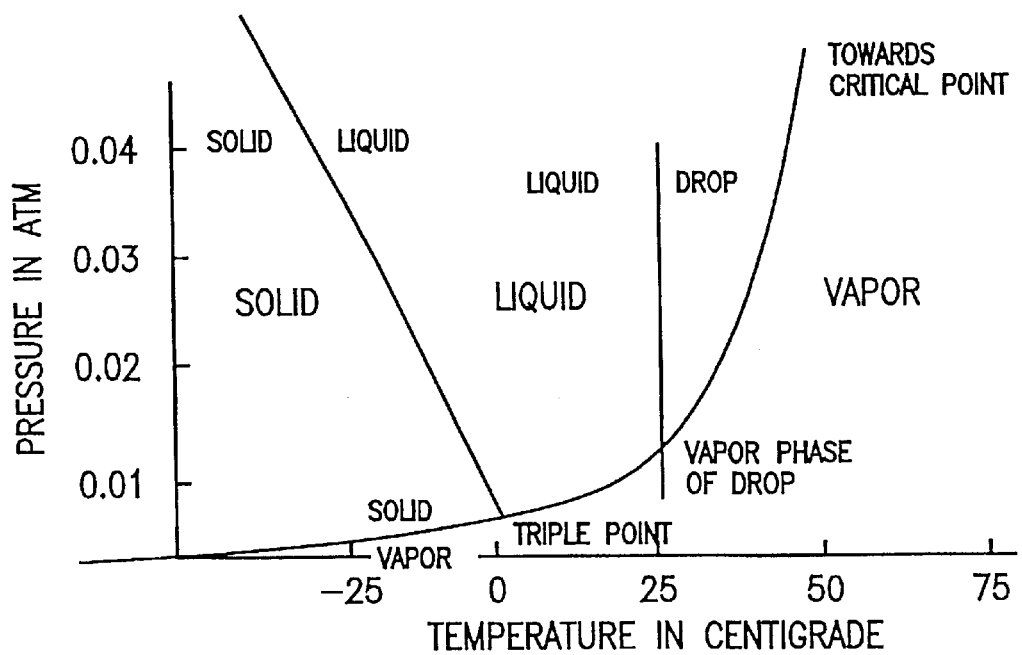
FIG. 1 is a graphical representation of phase change diagram for water.

For a pure liquid in equilibrium in its vapor phase, the Clausius-Clapeyron equation and Gibbs phase rule can be used to determine the water-vapor curve, or evaporation curve, as shown in FIG. 1. If the temperature is above 0.098 C, the triple-point temperature, the only occurring phases are the liquid and vapor phases. If all values of temperature T and pressure P are allowed, the T, P plane is divided into three regions: solid, liquid and vapor. These three regions define a liquid-solid curve, a solid-vapor curve and a liquid-vapor curve, as shown. The three curves coincide at the triple point. For water, this triple point occurs at T=0.098 C and P=0.07 atm. The curves show that water vapor can exist at very low temperatures, so long as pressure is sufficiently low.

A liquid in a container at a pressure below the pressure of water vapor in the container (0.04 atm at 30 C) will vaporize very quickly and cool simultaneously as it does so. With water, a zero value of "f" in the Gibbs phase rule, the evaporating liquid derives the energy needed for evaporation from the surrounding ambient air. Introducing high-velocity water/air currents into the container at or near sonic speeds causes low pressure areas, e.g. below 0.04 atm, to form in the wake of each spherical droplet. This low pressure induces the droplets into a hydrodynamic phase change. Aerodynamically, this phenomenon is similar to the one that creates a region of low pressure under the wing of a plane and provides lift.

Experiments done by the inventor using Phase Doppler Interferometry and Particle Analyzer Anemometry analytical instrumentation, revealed that water droplets in a stream moving at sonic velocities inside an open-ended chamber tend to entrain each other, thus reducing collective hydrodynamic surface and opposition to friction. At velocities needed to overcome the sound barrier, greater friction enhances the collection of heat, which coalesces into vortices spinning from the surrounding air along the edge of the shock waves. It is in these highly energetic vortices that the droplets, already unstable and near the phase change point, experience the heat transfer necessary to evaporate.

When all the solution has evaporated, the only remaining substances from the traveling droplets are residual solid particles which, unlike the water in the solution, cannot evaporate. Once liquid-free, these solid particles fuse with each other, forced by the kinetic energy generated in the entrainment zone, forming large solid clusters, which precipitate out of the current by gravity.

As the entrainment flow loses velocity, the compact residue-free vapor travels a few milliseconds due to momentum, leaving behind the low-pressure, turbulent heat-evaporating regions and entering a normalized pressure environment of room air. It is in this normal environment that the vapor experiences another fast hydrodynamic phase change and condenses instantly into liquid mist As it condenses, the mist liberates heat, thus returning most of the energy taken from the air and helping to maintain the energy balance of the process indefinitely.

According to the foregoing, the method underlying the invention is predicated on the following classical physics postulates: (1) the injection of a water solution into a chamber, where, at room temperature, the solution evaporates, forcing the precipitation of the impurities dissolved or suspended in the water; (2) the immediate condensation of the vapor into liquid water mist; (3) the subsequent condensation of the mist into running water; and (4) the fresh water departing the apparatus by gravity.

Figure 2:
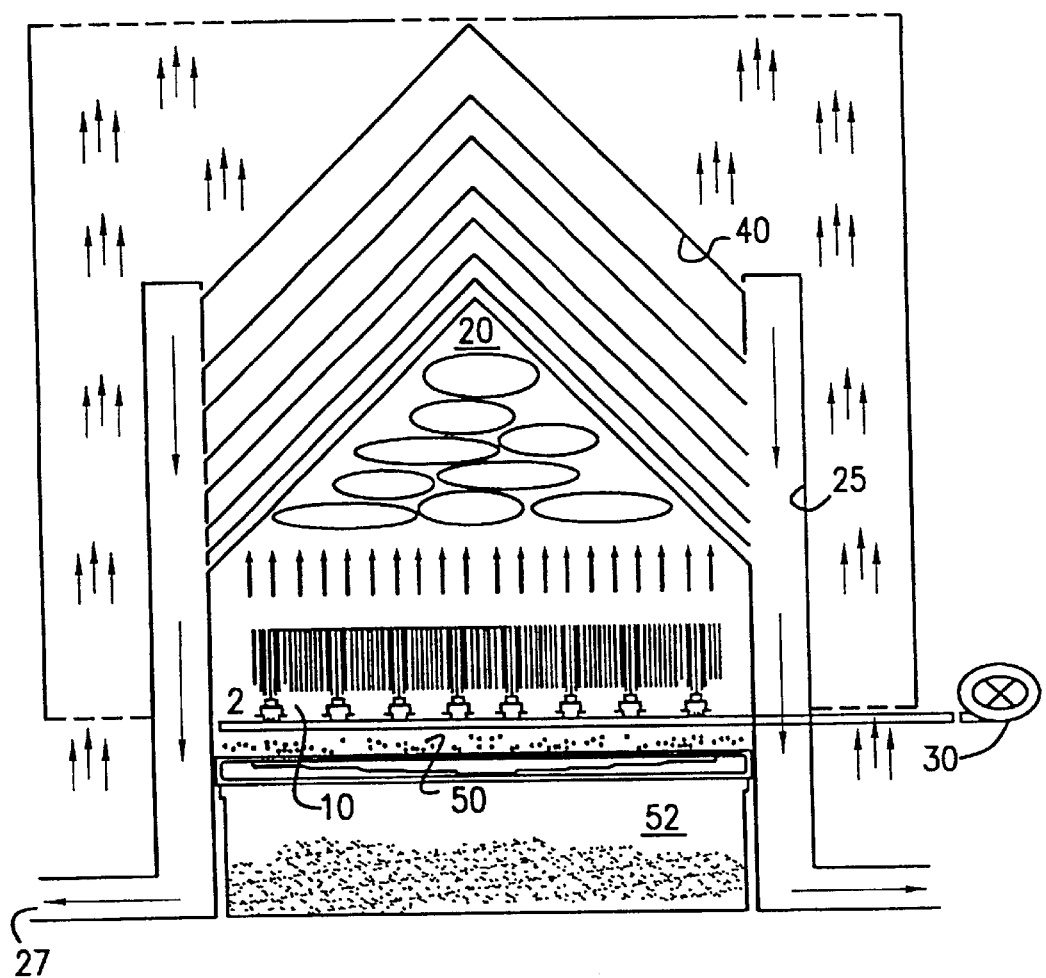
FIG. 2 is an environmental side perspective view of an embodiment of a solid-liquid separation system constructed according to principles of the invention
Figure 3:
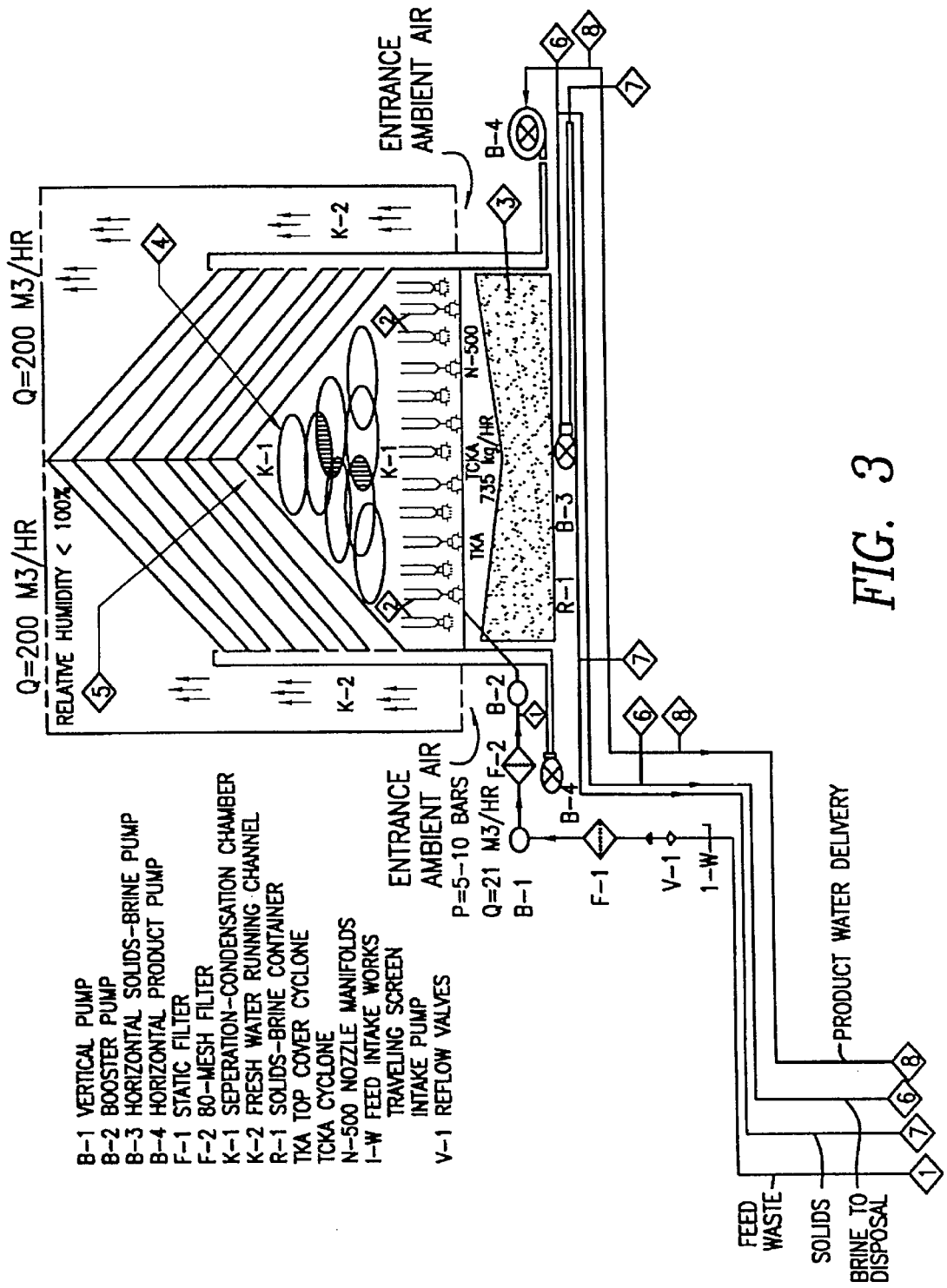
FIG. 3 is an environmental side perspective view of a commercial application of the embodiment of FIG. 2.
Figure 4:
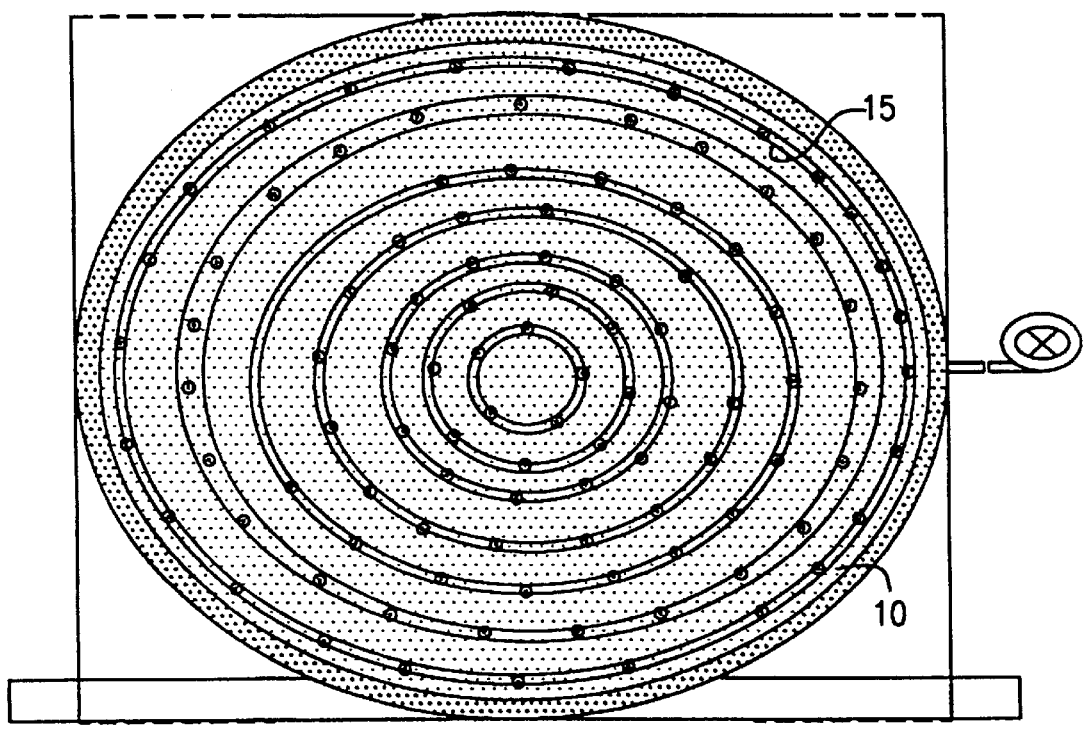
FIG. 4 is a top view of the embodiment of FIG. 2.

Referring to FIGS. 2 and 3, an embodiment configured according to principles of the invention includes sonic nozzles 10 capable of impelling liquid solutions without compressed air. The sonic nozzles 10 accelerate the solutions from 80 to 300 m/s in order to develop a jet stream of liquid droplets.

The solution is injected into a non-pressurized, open-ended evaporation-condensation chamber 20 such that ejection is substantially vertical. Vertical ejection aids in breaking the solution into droplets. Ideally, the droplets attain a size no smaller than 30 microns and no larger than 100 microns in diameter. This size range promotes complete evaporation of the solution and discourages recombination of the solid particles with the evaporated water.

The evaporation-condensation chamber 20 has an open-ended top and bottom. The evaporation-condensation chamber 20 may be assembled from a fiberglass cylinder encased in a steel container.

An injection pump 30 injects feed solution through a pipe 32 and manifold 34 into the evaporation-condensation chamber 20 through the battery of sonic nozzles 10. Preferably, the nozzles 10 are disposed in concentric circles in a horizontal plane, as shown in FIG. 3. The solution flows vertically from the nozzle orifices into the chamber 20 at sufficient velocity to break the liquid solution into small droplets and create low-pressure regions along the wake of the droplets.

The invention also includes nucleating screens 40 made of Partially Oriented Yarn (POY) nylon polyamide. POY permits texturing the resultant material with microscopic diabolo-type holes running the length of the screens 40 and accepts etched channels to nucleate the mist. POY has a high absorbing capacity for water mist, thus facilitates rapid nucleation of the mist and its transformation into running streams of fresh water, without washing the mist with artificially generated showers. The screens 40 are positioned, at angles to each other, at intervals long the length of the chamber 20 so as to capture all mist created in the evaporation-condensation chamber 20, and impede any mist from escaping from the chamber 20.

In the interior of the chamber 20, all of the liquid in the front line droplets rapidly evaporates at a short height, e.g. 15 to 30 cm, from each nozzle orifice, within a few milliseconds. The jets' momentum carries the instantly evaporated water masses into re-condensing particle-free droplets and a dense water mist, which quickly approaches and is absorbed by the nucleating screens. This absorption is accelerated by the upward vertical draft generated both by the temperature differential generated by the evaporation-condensation process and the pressure differential created by entry of air at the bottom and egress of the air from the top of the chamber. The fresh water mist adheres to the water-nucleating screens, which have lower edges that rest in a cylinder channel 25 encircling the evaporation-condensation chamber 20. When saturated with water, the screens 40 swiftly shed the mist into the channel 25 in running streams. The channel 25 flushes the water outside of the apparatus by gravity through a fresh water exit 27. The water is received in a collecting water tank or water main.

During evaporation of the solution, particles dissolved in the solution, but not evaporated, precipitate and drop by gravity between the nozzles into a cyclone or particle distributor/collector 50. The particle distributor/collector 50 deposits the particles into a receptacle 52. From the receptacle 52, the particles either are removed by a conveyor belt or accumulate in a removable container to be disposed of periodically.

Referring to FIG. 4, the battery of nozzles 10 are arranged along concentric arrays of manifolds 15 through which the solution is distributed to the nozzles 10. The nozzles 10 point vertically in such a manner as to deliver the liquid, create the droplets, and urge the ensuing vapor and condensed water mist toward the nucleating screens. The nozzles have orifices with diameters ranging between 0.75 and 1.23 mm. The nozzles are capable of injecting between 0.2 and 1.5 liters per minute of solution with dissolved or suspended particles. The nozzles produce spherical droplets with diameters between 30 and 80 microns.

The outside ambient air entering the apparatus provides more than enough energy for the feed solution phase changes. Additionally, the upward draft of the air through the chamber 20 contributes to drawing the water mist into the nucleating screens 40. Thus, the process is continuous and self-sufficient, without need of supplementary power-driven equipment.

A preferred method for producing liquid-droplets for evaporation and subsequent condensation entails: the generation of dense fresh water mist at approximately 30 cm from the nozzle orifices. The mist should be free of particles or solids and have a density between 12 to 18 kg per cubic meter of mist. Generation of the dense fresh water mist should be continuous and non-pulsating, yet discourage accumulating a suspension of fresh water droplets which would supersaturate of the evaporation-condensation area. The fresh water mist should saturate the condensation area with a density of 1 to 3 kg of mist per square meter per second, but without accumulations, until all of mist has been absorbed by the nucleating screens. The mist then combines to form running water.

The method also provides for separation of the solid particles dissolved or suspended in the liquid, and allowing the particles to drop by gravity from the evaporation-condensation area, through separations between nozzles in the manifold. The particles are evacuated without recombining with the vapor or the fresh water mist.

Another embodiment of the invention provides for recovering the fresh water mist by locating layers of water-collecting screens 40 in a serial or staggered manner. The screens 40 are positioned at angles with one another, the angles being between 30 and 60 degrees with respect the main cylinder of the apparatus or flow direction. The edges of the screens rest in the encircling water channel 25, just inside the evaporation-condensation chamber 20. The first screen 40 is positioned approximately 30 cm from the nozzle orifices and has a total surface area of approximately 10 square meters. Recovery of the fresh water from the mist in the collecting screens occurs by virtue of the momentum caused by the ejection jet and does not require artificially generated air currents in order to transport the mist outside of the evaporation-condensation area.

Fresh water from the collecting screens 40 is delivered into the circular water channel 25 surrounding the evaporation-condensation area, which transports the water outside of the apparatus, by gravity.

A preferred embodiment of a water treatment plant configured according to principles of the invention produce 15 to 20 cubic meters per day of a treated solution, depending on particulate concentration and climatic conditions. The nozzles 10 should be situated in manifold arrays to create a mist suspension of 0.06 liters per second/per nozzle with a density between 10 to 18 kg per cubic meter of mist. The shape and height of the cylindrical chamber 20 should be configured to circulate sufficient masses of ambient air to supply the necessary energy to effect the phase changes necessary for the separation process and the resultant internal temperature differential due to the phase changes. The sonic nozzles 10 should be able to propel 0.40 liters per minute of solution per nozzle unit and create droplets having diameters of 30 to 100 microns. Each nozzle orifice should have a diameter between 0.75 and 1.5-mm. The nozzles should be arranged so as to allow for the creation of clumps of particles fused together, separated from the vapor, which drop by gravity outside of the liquid jets, without interfering in the upward motion of the jets, and without recombining with the liquid.

Figure 5:
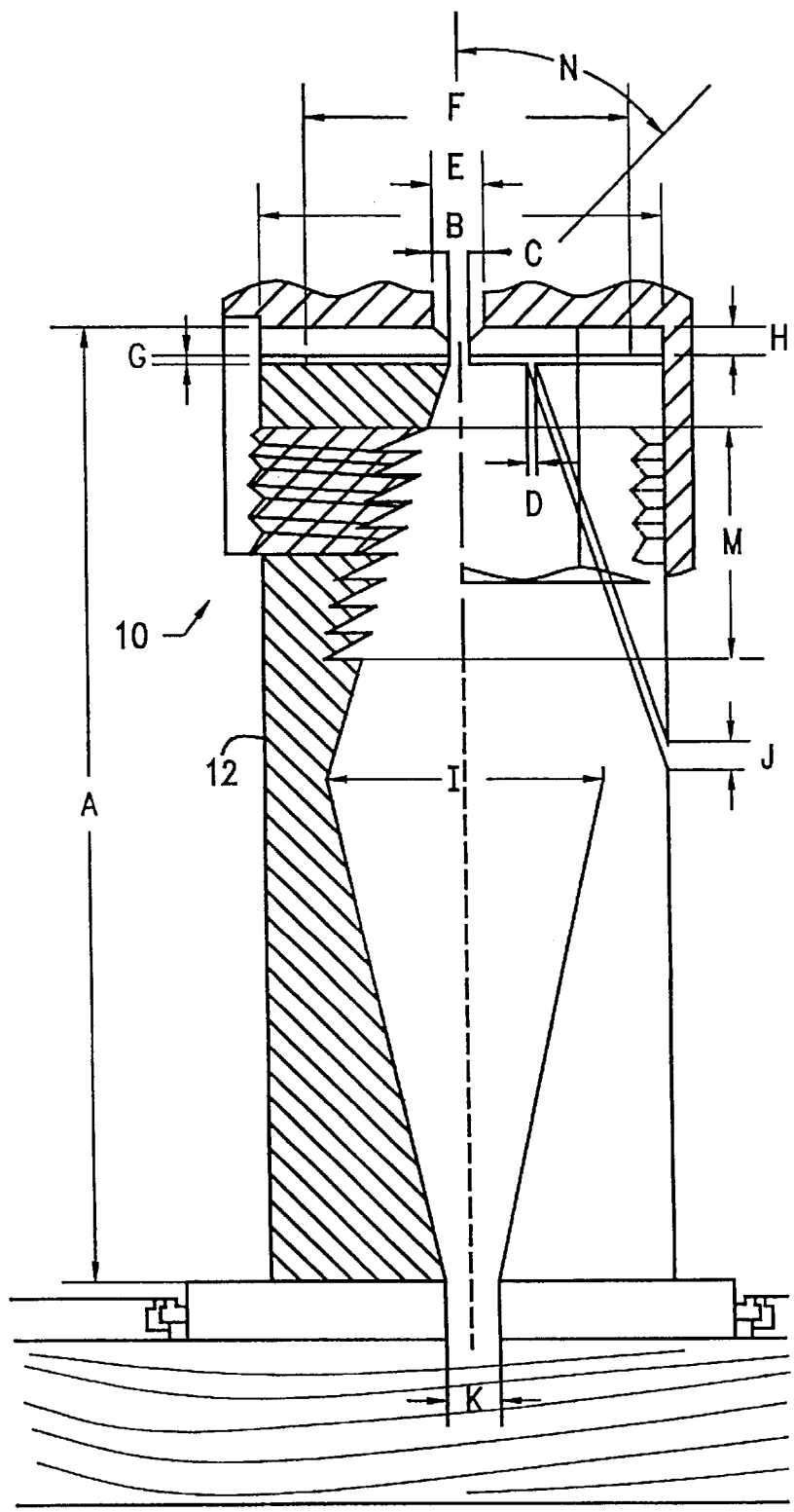
FIG. 5 is a vertical cross-sectional detail view of an embodiment of a sonic hydraulic nozzle constructed according to principles of the invention.
Figure 6:
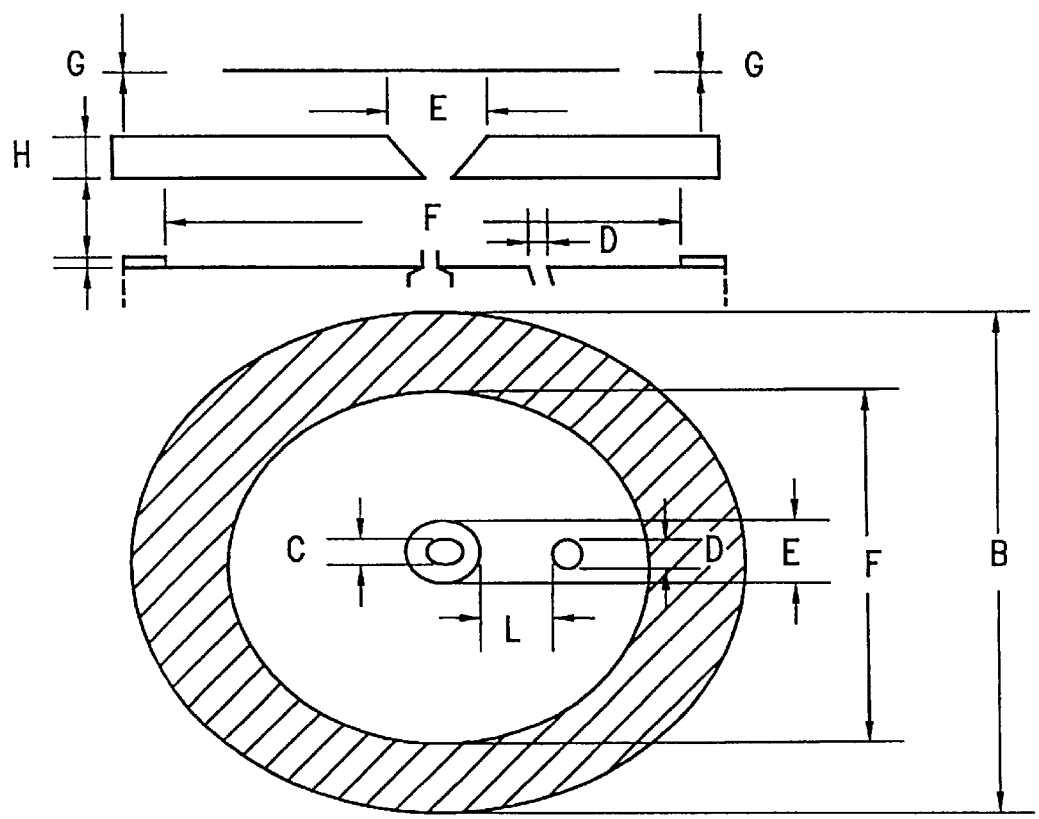
FIG. 6 is a horizontal cross-sectional detail view of the embodiment of FIG. 5.

Referring to FIGS. 5 and 6, a nozzle 10 configured according to principles of the invention provides a sonic effect, a relatively monodisperse droplet size and has a flow capacity of approximately zero to 235 kg per hour. The nozzle 10 receives solutions to be treated through the body of the nozzle through a narrow channel K. The channel K expands into a cone-shaped chamber I. From the chamber I, the solution passes through a turbulent-making area M. The turbulent making area provides a serrated surface generally orthogonal to the flow direction. Since expansion takes place in an inverse current flow, liquid is accelerated until it exits through orifice B. The orifice B has an area that is a fraction of the size of the base diameter of the cone.

Figure 7:
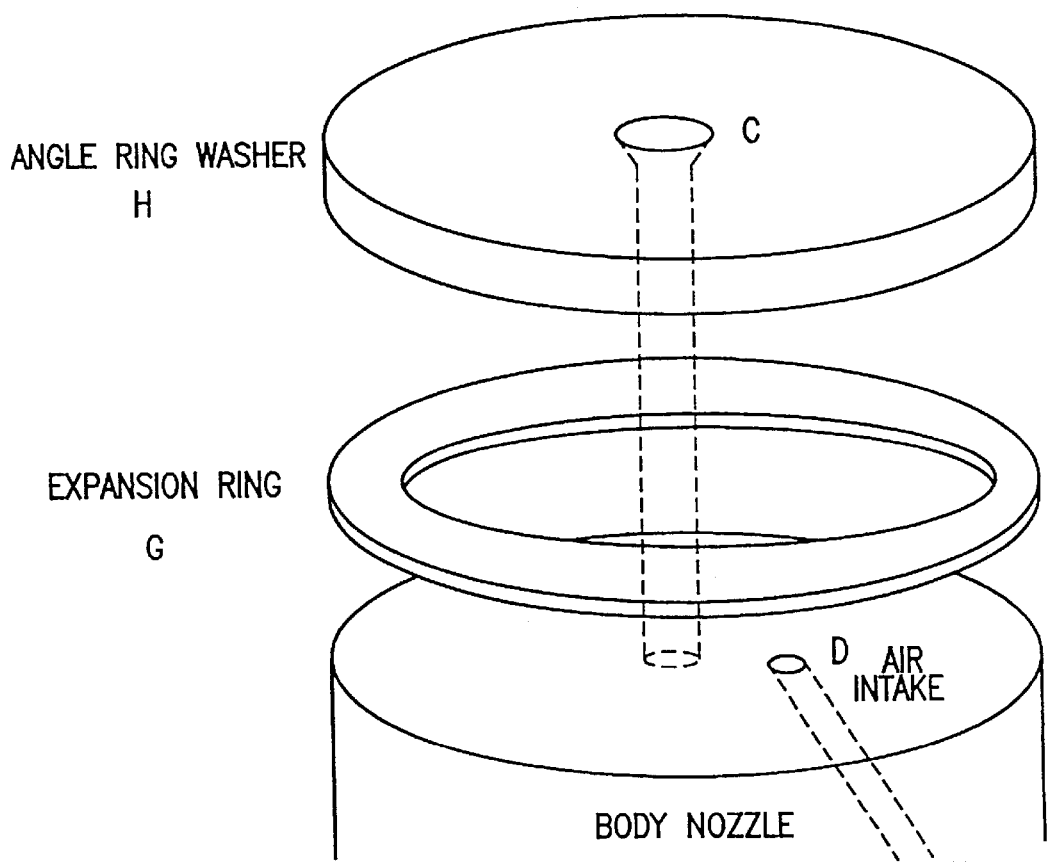
FIG. 7 is a partial, top side exploded view of the embodiment of FIG. 5.

Referring also to FIG. 7, through orifice C the liquid is further accelerated. Upon exiting at orifice C, the pressure differential with ambient environment produces a vacuum effect, which draws a column of exterior air through orifices J and D. At the exit of this column of air is an expansion ring G of less than 0.5 mm thickness which coincides with another expansion ring that is approximately 3.5 mm thick and has a smaller diameter size than orifice C. The rushing liquid and drawn air are mixed in the volume defined within the expansion ring, building substantial pressure before evacuating through the orifice C.

The mixture flows through an expanding chamber, between apertures C to B, the sides of which define an angle N relative to the flow direction. The angle N is a multiple of the liquid exit-orifice angle inside the nozzle chamber and the liquid-air mixture exit orifice angle. The aspired air mixed in the volume defined by the expansion ring further accelerates the liquid and induces turbulence in the near-vacuum environment near the nozzle orifice L. The initial liquid pressure at the injection pump head, plus the liquid pressure differential at the exit and the orifice angle all contribute to accelerate the liquid to the point that, at nozzle exit E, the liquid accelerates to sonic velocity.

Because the liquid exits the nozzle containing a minimum amount of air, there is little fractionating of the liquid, resulting in a monodisperse spectrum of droplets with controllable size ranges related to the pressure of the injected solution.

The dimensions for a preferred embodiment of the nozzle 10 are substantially as follows:

|  | A | B | C | D | E | F | G | H | I | J | K | L | M |
|---|---|---|---|---|---|---|---|---|---|---|---|---|---|
| Diameter | — | .735 | .076 | .046 | .104 | .484 |  | .735 | .464 | .092 | .234 |  |  |
| Length/Height | 1718 |  |  |  |  |  | .015 | .076 |  |  |  | .140 | .515 |
| Angle in |  |  |  |  | 90 |  |  |  |  | 110 |  |  | 45 |

The invention is not limited to the foregoing, but encompasses all improvements and substitutions consistent with the principles of the invention.

I claim:

1. A method for separating solids dissolved or suspended in a water-based solution and recuperating reusable water and solids therefrom consisting of:

injecting, without supplementary compressed air, the solution into an evaporating-condensing chamber and forming a dense spray of droplets;

whereby the droplets subsequently evaporate into vapor, thereby causing precipitation of the solids; and condensing the vapor into a mist.

2. The method of claim 1, wherein the solution is at ambient temperature.

3. The method of claim 1, wherein the evaporating-condensing chamber is at ambient temperature.

4. The method of claim 1, wherein the evaporating-condensing chamber is at ambient pressure.

5. The method of claim 1, wherein the evaporating-condensing chamber is a mist making chamber.

6. The method of claim 1, wherein said injecting the solution accelerates the solution to a velocity ranging between 200 and 300 meters per second.

7. The method of claim 1, wherein said injecting the solution is substantially vertical.

8. The method of claim 1, wherein the droplets attain a size ranging between 30 and 100 microns.

9. The method of claim 1, wherein the dense spray of droplets occurs substantially at 30 cm from a nozzle for performing said injecting.

10. The method of claim 1, wherein the mist is substantially free of solids and salts and has a density ranging between 12 and 18 kg per cubic meter.

11. The method of claim 1, wherein said injecting is continuous.

12. The method of claim 1, whereby the droplets do not accumulate or remain in a suspension in the evaporating-condensing chamber.

13. The method of claim 1, wherein a nozzle for performing said injecting has an orifice with a diameter of 0.75 to 1.25 mm.

14. The method of claim 1, wherein said injecting occurs at a rate ranging between 0.20 to 1.5 liters per minute.

15. The method of claim 1, wherein the solution is seawater, brackish water or mineralized water with undesirable salt content.

16. The method of claim 1, whereby the solids precipitated have sizes greater than 1 micron.

17. A method for separating solids dissolved or suspended in a water-based solution and recuperating reusable water and solids therefrom consisting of:

injecting, without supplementary compressed air, the solution into an evaporating-condensing chamber and forming a dense spray of droplets;

whereby the droplets subsequently evaporate into vapor, thereby causing precipitation of the solids;

condensing the vapor into a mist; and collecting the mist with a screen.

18. The method of claim 17, wherein the screen is positioned relative to a flow direction of the solution at an angle ranging from 30 to 60 degrees.

19. The method of claim 17, wherein the screen is positioned 30 cm from the nozzle.

20. The method of claim 17, wherein the screen is positioned such that the screen optimally collects mist carried to the screen due to momentum gained from said injecting.

* * * * *

UNITED STATES PATENT AND TRADEMARK OFFICE
CERTIFICATE OF CORRECTION

PATENT NO. : 6,299,735 B1  
DATED : October 9, 2001  
INVENTOR(S) : Manuel G. Lumbreras Page 1 of 1

It is certified that error appears in the above-identified patent and that said Letters Patent is hereby corrected as shown below:

<u>Title page,</u>
Item [60] should be deleted.

Signed and Sealed this

Seventh Day of May, 2002

*Attest:*

*Attesting Officer*

JAMES E. ROGAN  
*Director of the United States Patent and Trademark Office*